United States Patent
Imai et al.

(10) Patent No.: US 12,248,227 B2
(45) Date of Patent: Mar. 11, 2025

(54) METHOD FOR DRIVING OPTICAL ELEMENT

(71) Applicant: Japan Display Inc., Tokyo (JP)

(72) Inventors: Takayuki Imai, Tokyo (JP); Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/439,314

(22) Filed: Feb. 12, 2024

(65) Prior Publication Data

US 2024/0192570 A1 Jun. 13, 2024

Related U.S. Application Data (63) Continuation of application No. PCT/JP2022/028427, filed on Jul. 22, 2022.

(30) Foreign Application Priority Data

Sep. 3, 2021 (JP) .................. 2021-144295

(51) Int. Cl.
G02F 1/29 (2006.01)
(52) U.S. Cl.
CPC ............ G02F 1/29 (2013.01); *G02F 2203/07* (2013.01)
(58) Field of Classification Search
CPC .............................. G02F 1/29; G02F 2203/07
USPC ..................................... 349/13, 74, 139–148
See application file for complete search history.

(56) References Cited

U.S. PATENT DOCUMENTS

| 2005/0243237 A1 | 11/2005 | Sasuga |
| 2010/0149444 A1 | 6/2010 | Hikmet et al. |
| 2014/0104518 A1 | 4/2014 | Saitou et al. |

(Continued)

FOREIGN PATENT DOCUMENTS

| JP | 2005-317879 A | 11/2005 |
| JP | 2010-230887 A | 10/2010 |
| JP | 2012-128276 A | 7/2012 |

(Continued)

OTHER PUBLICATIONS

Search Report issued in International Patent Application No. PCT/JP2022/028427, mailed Sep. 6, 2022 and English translation of same. 5 pages.

(Continued)

*Primary Examiner* — Charles S Chang
(74) *Attorney, Agent, or Firm* — K&L Gates LLP (57) ABSTRACT

In a method for driving an optical element including a first liquid crystal cell, the first liquid crystal cell includes a first substrate on which first and second transparent electrodes are arranged in a first direction, a second substrate on which third and fourth transparent electrodes are arranged in a second direction, and a first liquid crystal layer between the first substrate and the second substrate, and the method includes the steps of inputting a first signal to the first transparent electrode, inputting a second signal having a phase difference of $\pi$ with respect to the first signal to the second transparent electrode, inputting a third signal having a phase difference of $\alpha$ with respect to the first signal to the third transparent electrode, and inputting a fourth signal having a phase difference of $\pi$ with respect to the third signal to the fourth transparent electrode.

7 Claims, 11 Drawing Sheets

(56) References Cited

U.S. PATENT DOCUMENTS

2017/0269453 A1\* 9/2017 Galstian .................... G02F 1/29
2018/0196318 A1\* 7/2018 Presniakov ....... G02F 1/134363

FOREIGN PATENT DOCUMENTS

JP        2014-081419 A    5/2014
JP        2014-160277 A    9/2014

OTHER PUBLICATIONS

Written Opinion issued in International Patent Application No. PCT/JP2022/028427, mailed Sep. 6, 2022. 4 pages.

English translation of Office Action issued in related Japanese Patent Application No. 2023-545155, mailed on Aug. 6, 2024. 3 pages.

\* cited by examiner

METHOD FOR DRIVING OPTICAL ELEMENT

CROSS-REFERENCE TO RELATED APPLICATIONS

This application is a Continuation of International Patent Application No. PCT/JP2022/028427, filed on Jul. 22, 2022, which claims the benefit of priority to Japanese Patent Application No. 2021-144295, filed on Sep. 3, 2021, the entire contents of which are incorporated herein by reference.

FIELD

An embodiment of the present invention relates to a method for driving an optical element that controls the distribution of light emitted from a light source, in particular, an optical element using a liquid crystal.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2005-317879, 2010-230887, or 2014-160277). For example, the lighting devices disclosed in the Japanese laid-open patent publications Nos. 2005-317879 and 2010-230877 use a liquid crystal lens to distribute light from a light source in a circular shape. Further, the beam shaping device disclosed in the Japanese laid-open patent publication No. 2014-160277 changes the distribution shape of light by changing patterns of an electrode applied to a liquid crystal.

SUMMARY

In a method for driving an optical element including a first liquid crystal cell according to an embodiment of the present invention, the first liquid crystal cell includes a first substrate on which a first transparent electrode and a second transparent electrode are alternately arranged in a first direction, a second substrate on which a third transparent electrode and a fourth transparent electrode are alternately arranged in a second direction orthogonal to the first direction, and a first liquid crystal layer between the first substrate and the second substrate, and the method includes the steps of inputting a first signal to the first transparent electrode, inputting a second signal having a phase difference of $\pi$ with respect to the first signal to the second transparent electrode, inputting a third signal having a phase difference of $\alpha$ with respect to the first signal to the third transparent electrode, and inputting a fourth signal having a phase difference of $\pi$ with respect to the third signal to the fourth transparent electrode.

DESCRIPTION OF EMBODIMENTS

In an optical element using a liquid crystal, the shape of the light distribution can also be changed by changing the amplitude of the potential applied to the liquid crystal. However, a complex control circuit including a digital-to-analog conversion circuit (DAC) or an amplification circuit (AMP) is required in order to change the magnitude of the potential amplitude, and there is a problem that it is difficult to finely adjusting the light distribution. Therefore, an optical element in which the light distribution can be easily controlled is desired.

In view of the above problem, an embodiment of the present invention can provide a method for driving an optical element in which a light distribution can be easily controlled.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

1. Configuration of Optical Element 10

Figure 1:
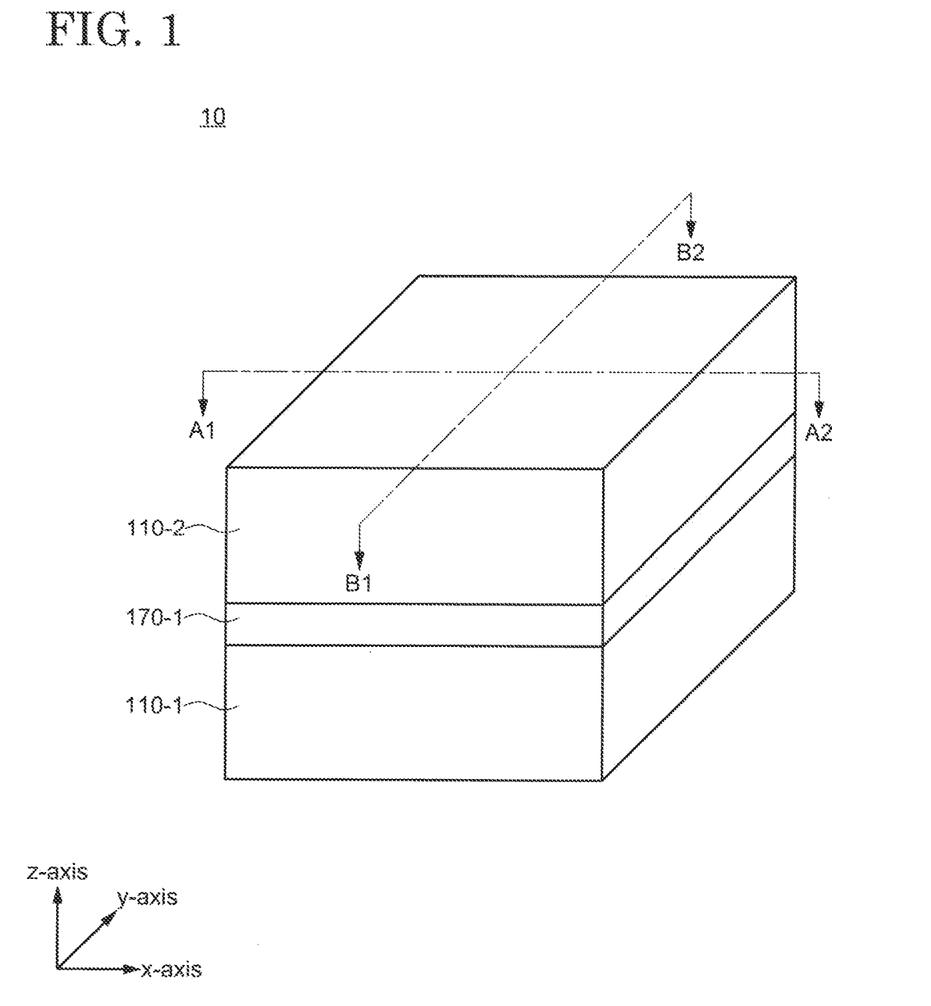
FIG. 1 is a schematic perspective view of an optical element according to an embodiment of the present invention.

FIG. 1 is a schematic perspective view of an optical element 10 according to an embodiment of the present invention. As shown in FIG. 1, the optical element 10 includes a first liquid crystal cell 110-1 and a second liquid crystal cell 110-2. The second liquid crystal cell 110-2 is placed on the first liquid crystal cell 110-1 via a first optical elastic resin layer 170-1. That is, the optical element 10 has a structure in which the first liquid crystal cell 110-1 and the second liquid crystal cell 110-2 are stacked in a z-axis direction. The first optical elastic resin layer 170-1 adheres and fixes the first liquid crystal cell 110-1 and the second liquid crystal cell 110-2. An adhesive containing a translucent acrylic resin, epoxy resin, or the like can be used for the first optical elastic resin layer 170-1.

Figure 2A:
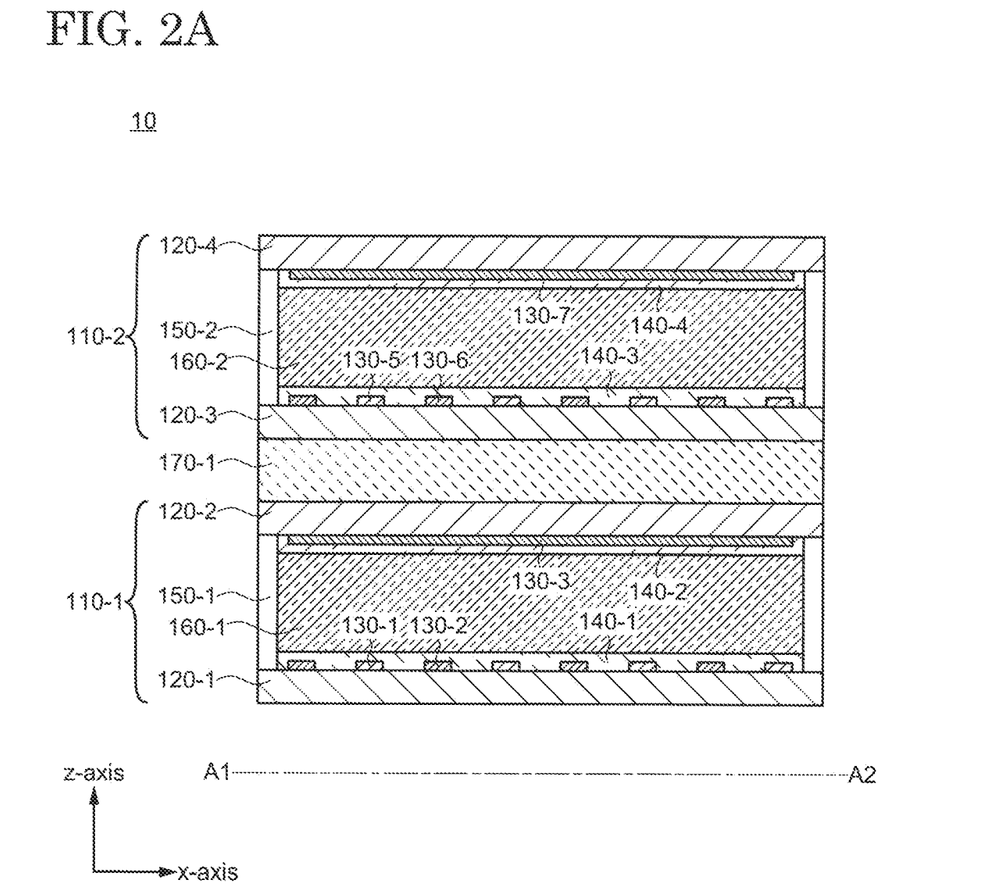
FIG. 2A is a schematic cross-sectional view of an optical element according to an embodiment of the present invention.
Figure 2B:
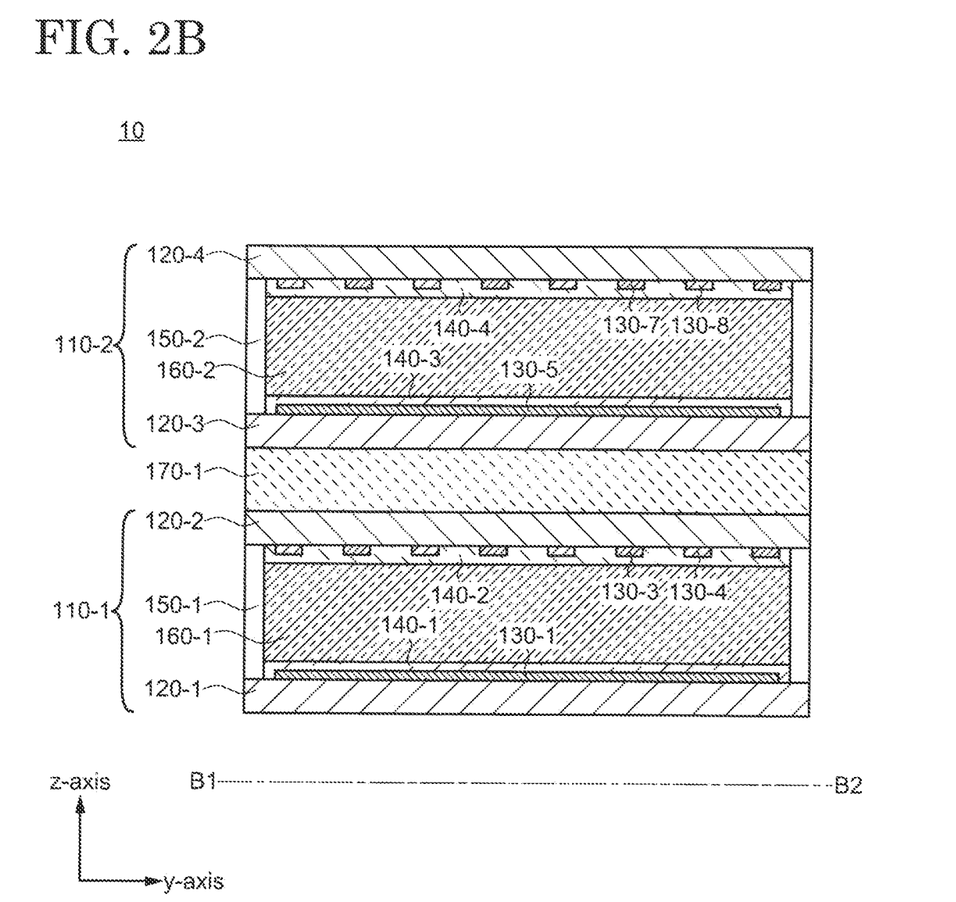
FIG. 2B is a schematic cross-sectional view of an optical element according to an embodiment of the present invention.

FIG. 2A and FIG. 2B are schematic cross-sectional views of the optical element 10 according to an embodiment of the present invention. Specifically, FIG. 2A is a schematic cross-sectional view in a zx plane taken along the line A1-A2 shown in FIG. 1, and FIG. 2B is a schematic cross-sectional view taken along the line B1-B2 shown in FIG. 1. FIG. 3 is a schematic cross-sectional view taken in a yz plane. In addition, hereinafter, an x-axis direction and a y-axis direction may be described as a first direction and a second direction orthogonal to the first direction, respectively.

The first liquid crystal cell 110-1 includes a first substrate 120-1 on which a first transparent electrode 130-1 and a second transparent electrode 130-2 are formed and a second substrate 120-2 on which a third transparent electrode 130-3 and a fourth transparent electrode 130-4 are formed. A first alignment film 140-1 is formed over the first substrate 120-1 in order to cover the first transparent electrode 130-1 and the second transparent electrode 130-2. Further, a second alignment film 140-2 is formed over the second substrate 120-2 in order to cover the third transparent electrode 130-3 and the fourth transparent electrode 130-4. The first substrate 120-1 and the second substrate 120-2 are arranged so that the first transparent electrode 130-1 and the second transparent electrode 130-2 on the first substrate 120-1 and the third transparent electrode 130-3 and the fourth transparent electrode 130-4 on the second substrate 120-2 face each other in a crosswise manner (hereinafter, the same configuration is applied). Further, a first sealing member 150-1 is formed around each of the first substrate 120-1 and the second substrate 120-2. That is, the first substrate 120-1 and the second substrate 120-2 are bonded to each other via the first sealing member 150-1. Further, a liquid crystal is sealed in a space surrounded by the first substrate 120-1 (more specifically, the first alignment film 140-1), the second substrate 120-2 (more specifically, the second alignment film 140-2), and the first sealing member 150-1 to form a first liquid crystal layer 160-1.

The second liquid crystal cell 110-2 includes a third substrate 120-3 on which a fifth transparent electrode 130-5 and a sixth transparent electrode 130-6 are formed and a fourth substrate 120-4 on which a seventh transparent electrode 130-7 and an eighth transparent electrode 130-8 are formed. A third alignment film 140-3 is formed on the third substrate 120-3 in order to cover the fifth transparent electrode 130-5 and the sixth transparent electrode 130-6. Further, a fourth alignment film 140-4 is formed on the fourth substrate 120-4 in order to cover the seventh transparent electrode 130-7 and the eighth transparent electrode 130-8. The third substrate 120-3 and the fourth substrate 120-4 are arranged so that the fifth transparent electrode 130-5 and the sixth transparent electrode 130-6 on the third substrate 120-3 and the seventh transparent electrode 130-7 and the eighth transparent electrode 130-8 on the fourth substrate 120-4 face each other. Further, a second sealing member 150-2 is formed around each of the third substrate 120-3 and the fourth substrate 120-4. That is, the third substrate 120-3 and the fourth substrate 120-4 are bonded to each other via the second sealing member 150-2. Further, a liquid crystal is sealed in a space surrounded by the third substrate 120-3 (more specifically, the third alignment film 140-3), the fourth substrate 120-4 (more specifically, the fourth alignment film 140-4), and the second sealing member 150-2 to form a second liquid crystal layer 160-2.

The first liquid crystal cell 110-1 and the second liquid crystal cell 110-2 have the same basic configuration. Therefore, in the following description, an arrangement of the transparent electrodes 130 of the first liquid crystal cell 110-1 is described, and the description of an arrangement of the transparent electrodes 130 of the second liquid crystal cell 110-2 is omitted.

In the first liquid crystal cell 110-1, the first transparent electrode 130-1 and the second transparent electrode 130-2 extend in the y-axis direction, and the third transparent electrode 130-3 and the fourth transparent electrode 130-4 extend in the x-axis direction. Further, the first transparent electrode 130-1 and the second transparent electrode 130-2 are arranged alternately in a comb-teeth shape in the x-axis direction, and the third transparent electrode 130-3 and the fourth transparent electrode 130-4 are alternately arranged in a comb-teeth shape in the y-axis direction. In a plan view, although the extending direction (y-axis direction) of the first transparent electrode 130-1 and the second transparent electrode 130-2 is orthogonal to the extending direction (x-axis direction) of the third transparent electrode 130-3 and the fourth transparent electrode 130-4, they may intersect each other with a slight shift from the orthogonal direction.

In the plan view, the first transparent electrode 130-1 of the first liquid crystal cell 110-1 and the fifth transparent electrode 130-5 of the second liquid crystal cell 110-2 overlap each other so that their extending directions (y-axis direction) substantially match each other. However, the first liquid crystal cell 110-1 and the second liquid crystal cell 110-2 may be arranged so that the first transparent electrode 130-1 and the fifth transparent electrode 130-5 overlap each other with a slight shift.

For example, a rigid substrate having light-transmitting properties such as a glass substrate, a quartz substrate, or a sapphire substrate is used as each of the first substrate 120-1 to the fourth substrate 120-4. Further, a flexible substrate having light-transmitting properties such as a polyimide resin substrate, an acrylic resin substrate, a siloxane resin substrate, or a fluorine resin substrate can also be used as each of the first substrate 120-1 to the fourth substrate 120-4.

Each of the first transparent electrode 130-1 to the eighth transparent electrode 130-8 functions as an electrode for forming an electric field in the liquid crystal layer 160. For example, a transparent conductive material such as indium tin oxide (ITO) or indium zinc oxide (IZO) is used for each of the first transparent electrode 130-1 to the eighth transparent electrode 130-8.

Each of the first liquid crystal layer 160-1 and the second liquid crystal layer 160-2 can refract transmitted light or change the polarization state of transmitted light according to the alignment state of the liquid crystal molecules. For example, nematic liquid crystal can be used as the liquid crystal of each of the first liquid crystal layer 160-1 and the second liquid crystal layer 160-2. Although a positive liquid crystal is adopted in the embodiment, it is also possible to adopt a configuration of a negative liquid crystal by changing the initial alignment direction of the liquid crystal molecules. Further, the liquid crystal preferably contains a chiral agent that imparts twist to the liquid crystal molecules.

Each of the first alignment film 140-1 to the fourth alignment film 140-4 aligns the liquid crystal molecules in the liquid crystal layer 160 in a predetermined direction. For example, a polyimide resin or the like can be used for each of the first alignment film 140-1 to the fourth alignment film 140-4. In addition, each of the first alignment film 140-1 to the fourth alignment film 140-4 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the first sealing member 150-1 and the second sealing member 150-2. The adhesive material may be of an ultraviolet curable type or a heat curable type.

Although FIG. 1 to FIG. 2B show the optical element 10 including two liquid crystal cells 110, the number of liquid crystal cells 110 in the optical element 10 is not limited to two. The number of liquid crystal cells 110 included in the optical element 10 may be one, or three or more. However, when the optical element 10 includes at least two liquid crystal cells 110, the optical element 10 can control the light distribution of unpolarized light. In this case, it is not necessary to provide a pair of polarizing plates, which are provided on the front and back surfaces of the liquid crystal display element. Specifically, in the optical element 10 shown in FIG. 1 to FIG. 2B, it is not necessary to provide a polarizing plate on each of the surfaces of the first substrate 120-1 of the first liquid crystal cell 110-1 and the fourth substrate 120-4 of the second liquid crystal cell 110-2.

2. Control of Light Distribution by Optical Element 10

Figure 3A:
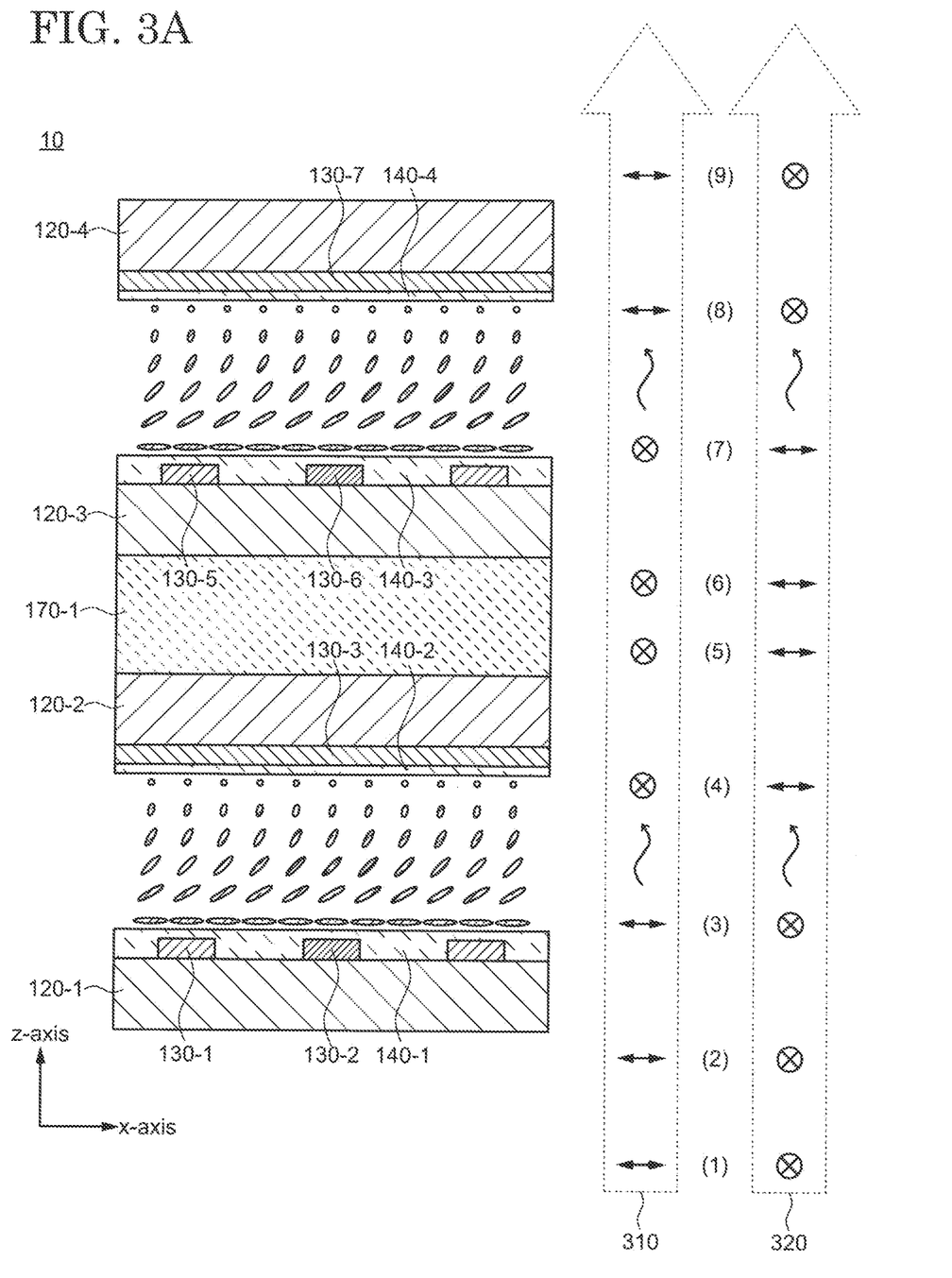
FIG. 3A is a schematic cross-sectional view illustrating control of a light distribution by an optical element according to an embodiment of the present invention.
Figure 3B:
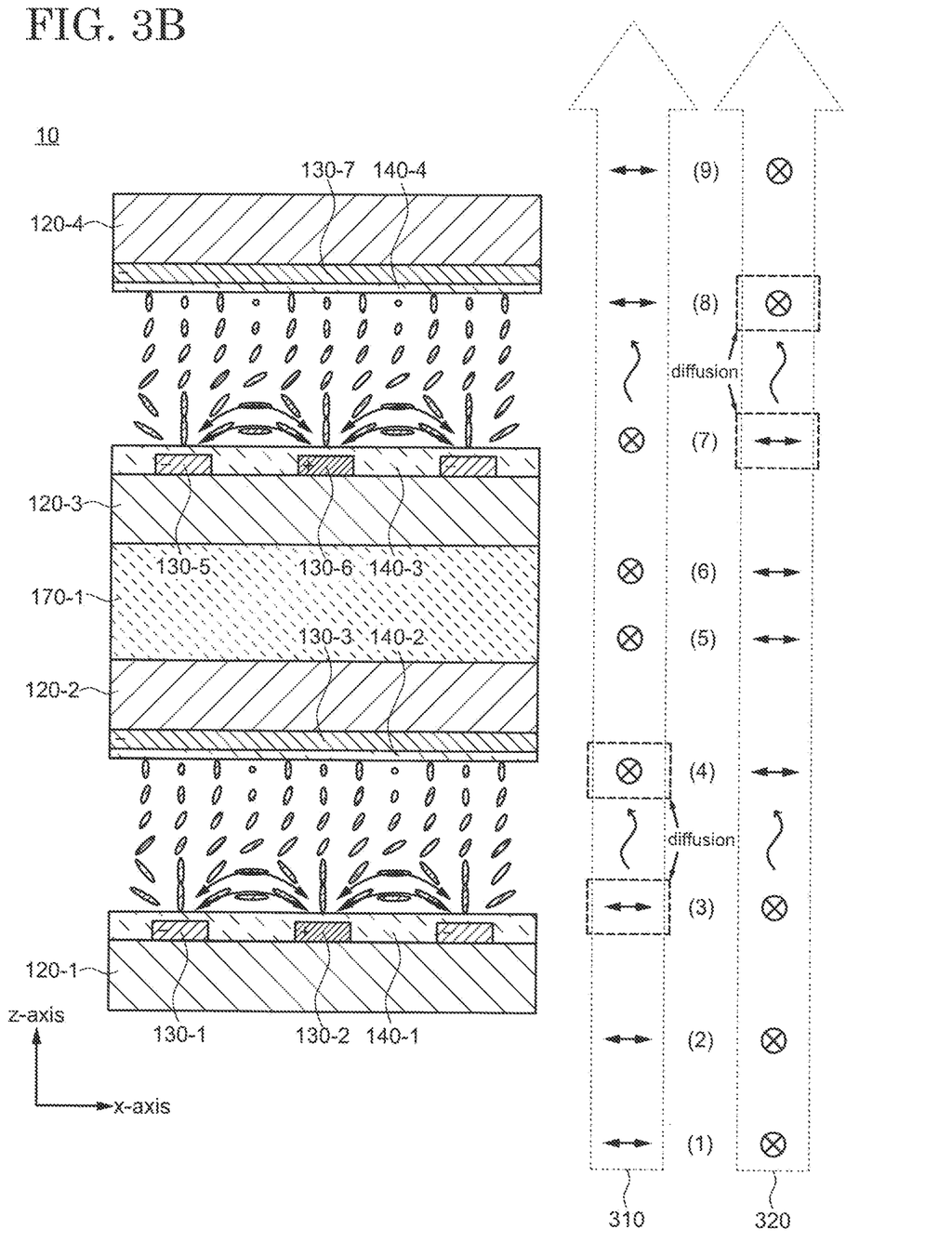
FIG. 3B is a schematic cross-sectional view illustrating control of a light distribution by an optical element according to an embodiment of the present invention.

FIG. 3A and FIG. 3B are schematic cross-sectional views illustrating control of a light distribution by the optical element 10 according to an embodiment of the present invention. FIG. 3A and FIG. 3B show a part of a cross-sectional view of the first liquid crystal cell 110-1 and the second liquid crystal cell 110-2 shown in FIG. 2A. FIG. 3A shows the optical element 10 in a state where no potential is supplied to the transparent electrodes 130, and FIG. 3B shows the optical element 10 in a state where the transparent electrodes 130 are supplied with a potential. In addition, the control of supply of potentials (input of signals) to the transparent electrodes 130 is described later.

The alignment treatment in the x-axis direction is performed on the first alignment film 140-1. Thus, as shown in FIG. 3A, the long axes of the liquid crystal molecules on the side of the first substrate 120-1 in the first liquid crystal layer 160-1 are aligned along the x-axis direction. That is, the alignment direction of the liquid crystal molecules on the side of the first substrate 120-1 is orthogonal to the extending direction (y-axis direction) of the first transparent electrode 130-1 and the second transparent electrode 130-2. Further, the alignment treatment in the y-axis direction is performed on the second alignment film 140-2. Thus, as shown in FIG. 3A, the long axes of the liquid crystal molecules on the side of the second substrate 120-2 in the first liquid crystal layer 160-1 are aligned along the y-axis direction. That is, the alignment direction of the liquid crystal molecules on the side of the second substrate 120-2 is orthogonal to the extending direction (x-axis direction) of the third transparent electrode 130-3 and the fourth transparent electrode 130-4. Therefore, the direction of the long axes of the liquid crystal molecules in the first liquid crystal layer 160-1 gradually change from the x-axis direction to the y-axis direction moving from the first substrate 120-1 to the second substrate 120-2, and are aligned in a state twisted by 90 degrees.

Since the liquid crystal molecules in the second liquid crystal layer 160-2 are also similar to the liquid crystal molecules in the first liquid crystal layer 160-1, the description thereof is omitted here.

When potentials are supplied to the transparent electrodes 130, the alignment of the liquid crystal molecules changes as shown in FIG. 3B. Here, it is described that a low potential is supplied to the first transparent electrode 130-1, the third transparent electrode 130-3, the fifth transparent electrode 130-5, and the seventh transparent electrode 130-7, and a high potential is supplied to the second transparent electrode 130-2, the fourth transparent electrode 130-4, the sixth transparent electrode 130-6, and the eighth transparent electrode 130-8. In addition, in FIG. 3B, for convenience, the low potential and the high potential are illustrated using symbols "−" and "+", respectively. Hereinafter, the electric field generated between adjacent transparent electrodes may be referred to as a lateral electric field.

As shown in FIG. 3B, the liquid crystal molecules on the side of the first substrate 120-1 are aligned as a whole in a convex arc shape along the x-axis direction with respect to the first substrate 120-1 due to the influence of the lateral electric field between the first transparent electrode 130-1 and the second transparent electrode 130-2. Similarly, the liquid crystal molecules on the side of the second substrate 120-2 are aligned as a whole in a convex arc shape along the y-axis direction with respect to the second substrate 120-2 due to the influence of the lateral electric field between the third transparent electrode 130-3 and the fourth transparent electrode 130-4. The alignment of the liquid crystal molecules located approximately in the center between the first transparent electrode 130-1 and the second transparent electrode 130-2 is hardly changed by any lateral electric field. Therefore, light incident on the first liquid crystal layer 160-1 is diffused in the x-axis direction according to the refractive index distribution of the liquid crystal molecules on the side of the first substrate 120-1 aligned in the convex arc shape along the x-axis direction, and then is diffused in the y-axis direction according to the refractive index distribution of the liquid crystal molecules on the side of the second substrate 120-2 aligned in the convex arc shape along the y-axis direction.

In addition, since the first substrate 120-1 and the second substrate 120-2 have a sufficiently large distance between the substrates, the lateral electric field between the first transparent electrode 130-1 and the second transparent electrode 130-2 of the first substrate 120-1 does not affect the alignment of the liquid crystal molecules on the second substrate 120-2, or is negligibly small. Similarly, the lateral electric field between the third transparent electrode 130-3 and the fourth transparent electrode 130-4 of the second substrate 120-2 does not affect the alignment of the liquid crystal molecules on the first substrate 120-1, or is negligibly small.

Since the alignment of the liquid crystal molecules in the second liquid crystal layer 160-2 in the case where potentials are supplied to the fifth transparent electrode 130-5 to the eighth transparent electrode 130-8 are also the same as the alignment of the liquid crystal molecules in the first liquid crystal layer 160-1, the description thereof is omitted here.

Next, the distribution of light passing through the optical element 10 is described. Light emitted from the light source has a polarization component in the x-axis direction (hereinafter, referred to as "P-polarization component") and a polarization component in the y-axis direction (hereinafter, referred to as "S-polarization component"). However, for convenience, the polarization component of the light is divided into the P-polarization component and the S-polarization component in the following description. That is, the light emitted from the light source (see (1) in FIG. 3A and FIG. 3B) includes a first polarized light 310 having the P-polarization component and a second polarized light 320 having the S-polarization component. In addition, an arrow symbol and a circle symbol with a cross in FIG. 3A and FIG. 3B represent the P-polarization component and the S-polarization component, respectively.

After the first polarized light 310 is incident on the first substrate 120-1, the polarization component of the first polarized light 310 changes from the P-polarization component to the S-polarization component according to the twist of the alignment of the liquid crystal molecules as the first polarized light 310 approaches the second substrate 120-2 (see (2) to (4) in FIG. 3A and FIG. 3B). More specifically, although the first polarized light 310 has the polarization axis in the x-axis direction on the side of the first substrate 120-1, the polarization axis of the first polarized light 310 is gradually changed in the process of passing in the thickness direction of the first liquid crystal layer 160-1 and the first polarized light 310 has the S-polarization component on the side of the second substrate 120-2. Then, the first polarized light 310 is emitted from the second substrate 120-2 (see (5) in FIG. 3A and FIG. 3B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. Therefore, the first polarized light 310 is diffused in the x-axis direction according to the refractive index distribution of the liquid crystal molecules. Further, when a lateral electric field is generated between the third transparent electrode 130-3 and the fourth transparent electrode 130-4, the liquid crystal molecules on the side of the second substrate 120-2 are arranged along the y-axis direction in the convex arc shape due to the influence of the lateral electric field and the refractive index distribution changes. Therefore, the first polarized light 310 is diffused in the y-axis direction according to the change in the refractive index distribution of the liquid crystal molecules.

Therefore, when no lateral electric field is generated (see FIG. 3A), the polarization component of the first polarized light 310 transmitted through the first liquid crystal cell 110-1 changes from the P polarization component to the S polarization component. On the other hand, when the lateral electric field is generated (see FIG. 3B), the polarization component of the first polarized light 310 transmitted through the first liquid crystal cell 110-1 changes from the P polarization component to the S polarization component, and the first polarized light 310 is diffused in the x-axis direction and in the y-axis direction.

After the second polarized light 320 is incident on the first substrate 120-1, the polarization component of the second polarized light 320 changes from the S-polarization component to the P-polarization component according to the twist of the alignment of the liquid crystal molecules as the second polarized light 320 approaches the second substrate 120-2 (see (2) to (4) in FIG. 3A and FIG. 3B). More specifically, although the second polarized light 320 has the polarization axis in the y-axis direction on the side of the first substrate 120-1, the polarization axis of the second polarized light 320 is gradually changed in the process of passing in the thickness direction of the first liquid crystal layer 160-1 and the second polarized light 320 has the P-polarization component on the side of the second substrate 120-2, and then, the second polarized light 320 is emitted from the second substrate 120-2 (see (5) in FIG. 3A and FIG. 3B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. However, since the polarization axis of the second polarized light 320 is orthogonal to the alignment of the liquid crystal molecules on the side of the first substrate 120-1 side, the second polarized light 320 is not affected by the refractive index distribution of the liquid crystal molecules and passes without being diffused. Further, when a lateral electric field is generated between the third transparent electrode 130-3 and the fourth transparent electrode 130-4, the liquid crystal molecules on the side of the second substrate 120-2 are arranged in the y-axis direction in the convex arc shape due to the influence of the transverse electric field and the refractive index distribution changes. However, since the polarization axis of the second polarized light 320 is orthogonal to the alignment of the liquid crystal molecules on the side of the second substrate 120-2, the second polarized light 320 is not affected by the refractive index distribution of the liquid crystal molecules and passes without being diffused.

Therefore, not only when no lateral electric field is generated (see FIG. 3A) but also when a lateral electric field is generated (see FIG. 3B), the polarization component of the second polarized light 320 transmitted through the first liquid crystal cell 110-1 changes from the S-polarization component to the P-polarization component but the second polarized light 320 is not diffused.

The liquid crystal molecules in the second liquid crystal layer 160-2 of the second liquid crystal cell 110-2 also have the same refractive index distribution as the liquid crystal molecules in the first liquid crystal layer 160-1 of the first liquid crystal cell 110-1. However, since the polarization axes of the first polarized light 310 and the second polarized light 320 change by transmission through the first liquid crystal cell 110-1, the polarized light affected by the refractive index distribution of the liquid crystal molecules in the second liquid crystal layer 160-2 is reversed. That is, not only when no lateral electric field is generated (see FIG. 3A) but also when a lateral electric field is generated (see FIG. 3B), the polarization component of the first polarized light 310 transmitted through the second liquid crystal cell 110-2 changes from the S-polarization component to the P-polarization component but the first polarized light 310 is not diffused (see (6) to (8) in FIG. 3A and FIG. 3B). On the other hand, when no lateral electric field is generated (see FIG. 3A), the polarization component of the second polarized light 320 transmitted through the second liquid crystal cell 110-2 only changes from the P-polarization component to the S-polarization component. However, when a lateral electric field is generated (see FIG. 3B), the polarization component of the second polarized light 320 transmitted through the second liquid crystal cell 110-2 changes from the P-polarization component to the S-polarization component, and the second polarized light 320 is diffused in the x-axis direction and in the y-axis direction.

As can be seen from the above, in the optical element 10, by stacking the two liquid crystal cells 110, the polarization direction of the light incident on the optical element 10 changes twice. Thus, the same polarization direction of light before entering the optical element 10 and after being emitted from the optical element 10 can be maintained (see (1) and (9) in FIG. 3A and FIG. 3B). On the other hand, when potentials are supplied to the transparent electrodes in the optical element 10, the refractive index distribution of the liquid crystal molecules in the liquid crystal layer 160 of the liquid crystal cell 110 can change and the transmitted light can be refracted. More specifically, the first liquid crystal cell 110 diffuses the light of the first polarized component 310 (P-polarization component) in the x-axis direction, the y-axis direction, or both the x-axis and y-axis directions, and the liquid crystal cell 120 diffuses the light of the second polarized component 320 (S-polarization component) in the x-axis direction, the y-axis direction, or both the x-axis and y-axis directions.

3. Input of Signals to Transparent Electrodes 130 of Optical Element 10

Figure 4:
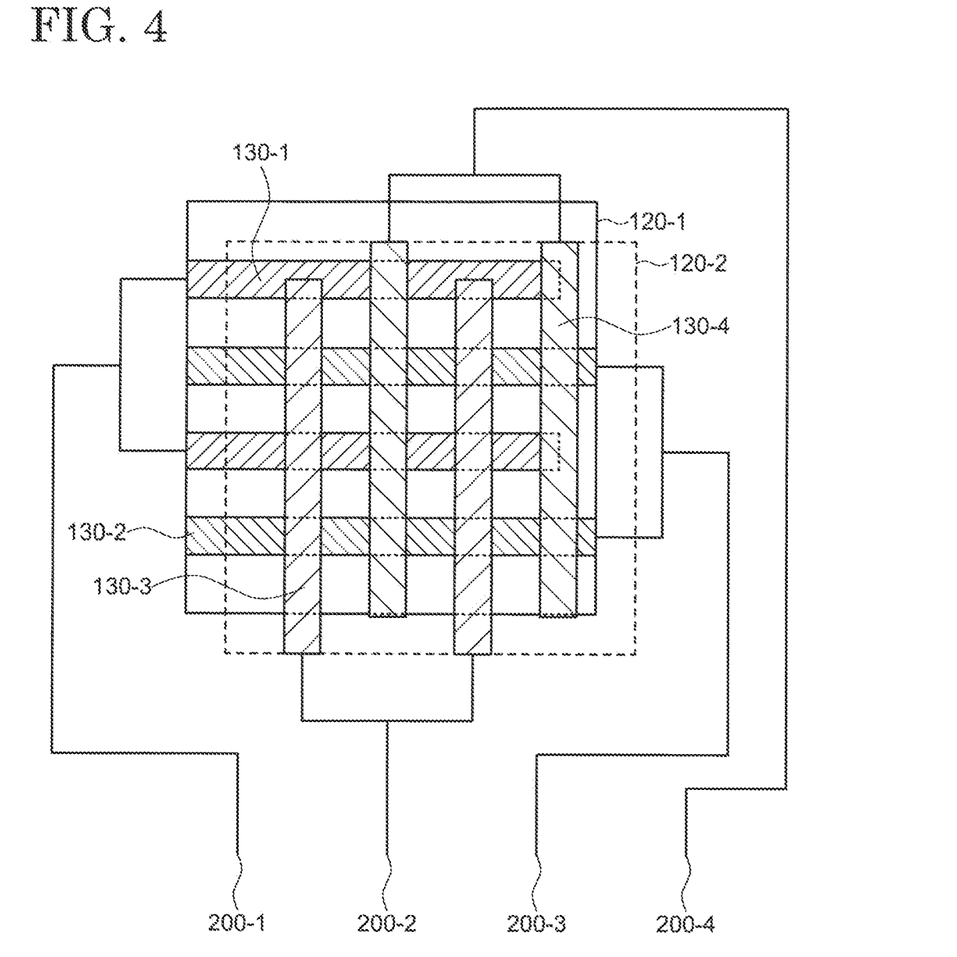
FIG. 4 is a schematic diagram illustrating signal lines input to transparent electrodes of an optical element according to an embodiment of the present invention.

FIG. 4 is a schematic diagram illustrating signal lines 200 input to the transparent electrodes 130 of the optical element 10 according to an embodiment of the present invention. In addition, FIG. 4 shows only the first transparent electrode 130-1 to the fourth transparent electrode 130-4 of the first liquid crystal cell 110-1. Further, in FIG. 4, the second substrate 120-2 is shown by a broken line for convenience of explanation.

The first transparent electrode 130-1, the second transparent electrode 130-2, the third transparent electrode 130-3, and the fourth transparent electrode 130-4 are electrically connected to a first signal line 200-1, a second signal line 200-2, a third signal line 200-3, and a fourth signal line 200-4. A first signal S1 is input to the first transparent electrode 130-1 via the first signal line 200-1. A second signal S2 is input to the second transparent electrode 130-2 via the second signal line 200-2. A third signal S3 is input to the third transparent electrode 130-3 via the third signal line 200-3. A fourth signal S4 is input to the fourth transparent electrode 130-4 via the fourth signal line 200-4.

Figure 5:
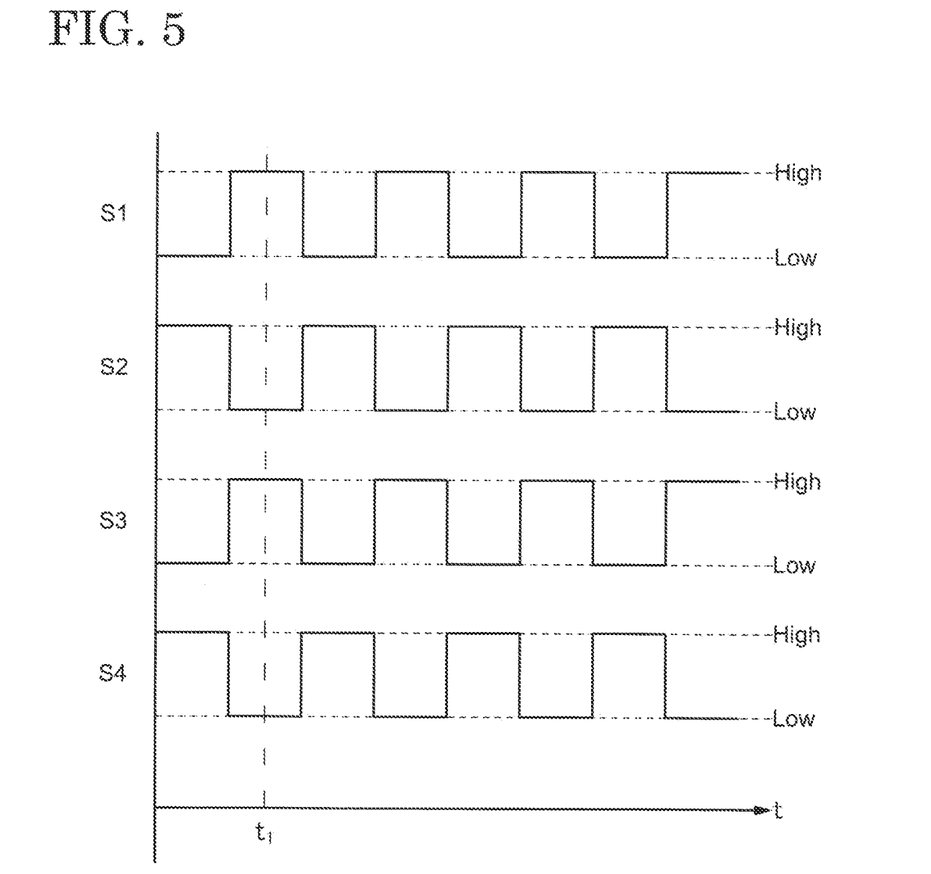
FIG. 5 is a timing chart of signals input to transparent electrodes of an optical element according to an embodiment of the present invention.
Figure 6:
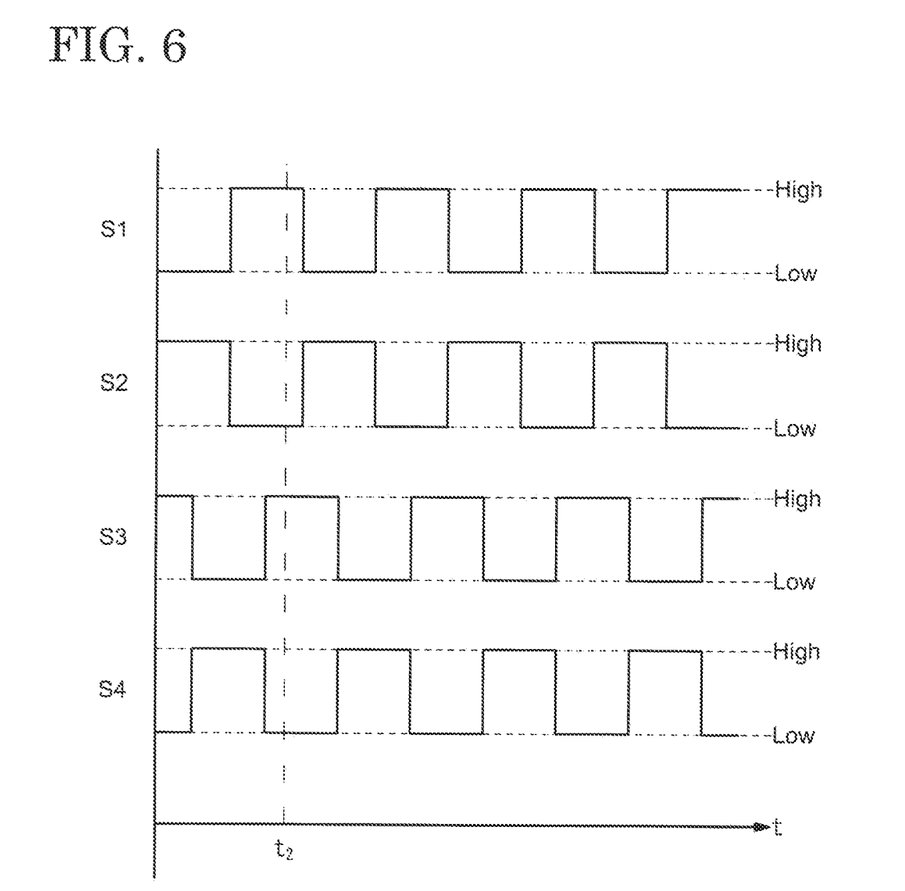
FIG. 6 is a timing chart of signals input to transparent electrodes of an optical element according to an embodiment of the present invention.

FIG. 5 and FIG. 6 are timing charts of the signals input to the transparent electrodes 130 in the optical element 10 according to an embodiment of the present invention. The first signal S1 to the fourth signal S4 shown in each of FIG. 5 and FIG. 6 are AC rectangular waves in which a high potential and a low potential are alternately repeated.

In the input of the signals shown in FIG. 5 and FIG. 6, the second signal S2 has a phase difference of $\pi$ (or $\lambda/2$) from the first signal S1. Further, the fourth signal S4 has a phase difference of $\pi$ (or $\lambda/2$) from the third signal S3. At signal input time t1 shown in FIG. 5 and signal input time t2 shown in FIG. 6, the high potential is supplied to the first transparent electrode 130-1, the low potential is supplied to the second transparent electrode 130-2, the high potential is supplied to the third transparent electrode 130-3, and the low potential is supplied to the fourth transparent electrode 130-4. As described above, since there is a potential difference between the first transparent electrode 130-1 and the second transparent electrode 130-2, light incident into the first substrate 120-1 of the first liquid crystal cell 110-1 is diffused by the liquid crystal molecules of the first liquid crystal layer 160-1 on the side of the first substrate 120-1. Similarly, since there is a potential difference between the third transparent electrode 130-3 and the fourth transparent electrode 130-4, the light passing through the first liquid crystal layer 160-1 is diffused by the liquid crystal molecules of the first liquid crystal layer 160-1 on the side of the second substrate 120-2. Therefore, in the input of the signals shown in FIG. 5 and the input of the signals shown in FIG. 6, the light distribution is controlled so that the light passing through the first liquid crystal cell 110-1 is diffused.

However, the phase differences between the signals are different from each other in the input of the signals shown in FIG. 5 and the input of the signals shown in FIG. 6. In the input of the signals shown in FIG. 5, the first signal S1 and the third signal S3 (or the second signal S2 and the fourth signal S4) are in the same phase. That is, there is no phase difference between the first signal S1 and the third signal S3. On the other hand, in the input of the signals shown in FIG. 6, $\pi/2$ (or $\lambda/4$) phase difference has occurred between the first signal S1 and the third signal S3 (or the second signal S2 and the fourth signal S4).

The inventors of the present invention have found that the light distribution changes by changing the phase of the signal input to the transparent electrode 130 of the liquid crystal cell 110. Therefore, in the method for driving the optical element 10 according to an embodiment of the present invention, the light distribution can be controlled by changing the phase of the signal input to the transparent electrode 130 of the liquid crystal cell 110.

The difference in the light distribution between the input of the signals shown in FIG. 5 and the input of the signals shown in FIG. 6 is described with reference to FIG. 7A to FIG. 8. In addition, since it can be said that there is no phase difference between the set of signals (the first signal S1 and the second signal S2) input to the transparent electrodes 130 on the side of the first substrate 120-1 and the set of signals (the third signal S3 and the fourth signal S4) input to the transparent electrodes 130 on the side of the second substrate 120-2 in the input of the signals shown in FIG. 5, the input of the signals shown in FIG. 5 is described as an input of the signals with a phase difference of 0 for convenience in the following description. Further, since it can be said that there is a phase difference of $\pi/2$ between the set of signals (the first signal S1 and the second signal S2) input to the transparent electrodes 130 on the side of the first substrate 120-1 and the set of signals (the third signal S3 and the fourth signal S4) input to the transparent electrodes 130 on the side of the first substrate 120-1, the input of signals shown in FIG. 6 is described as an input of signals with a phase difference of $\pi/2$ for convenience in the following description.

Figure 7A:
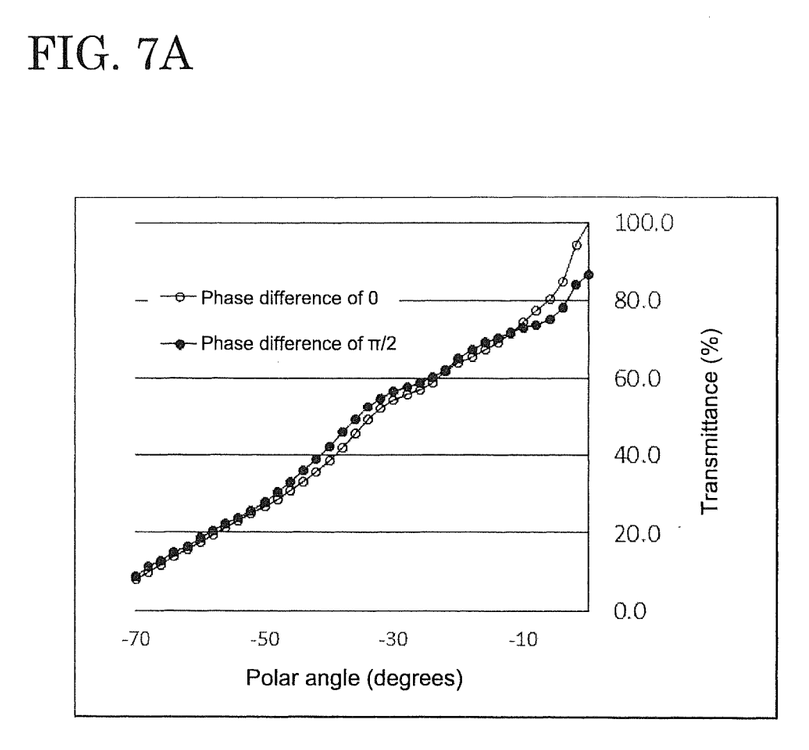
FIG. 7A is a graph showing a transmittance of a first liquid crystal cell of an optical element according to an embodiment of the present invention.
Figure 7B:
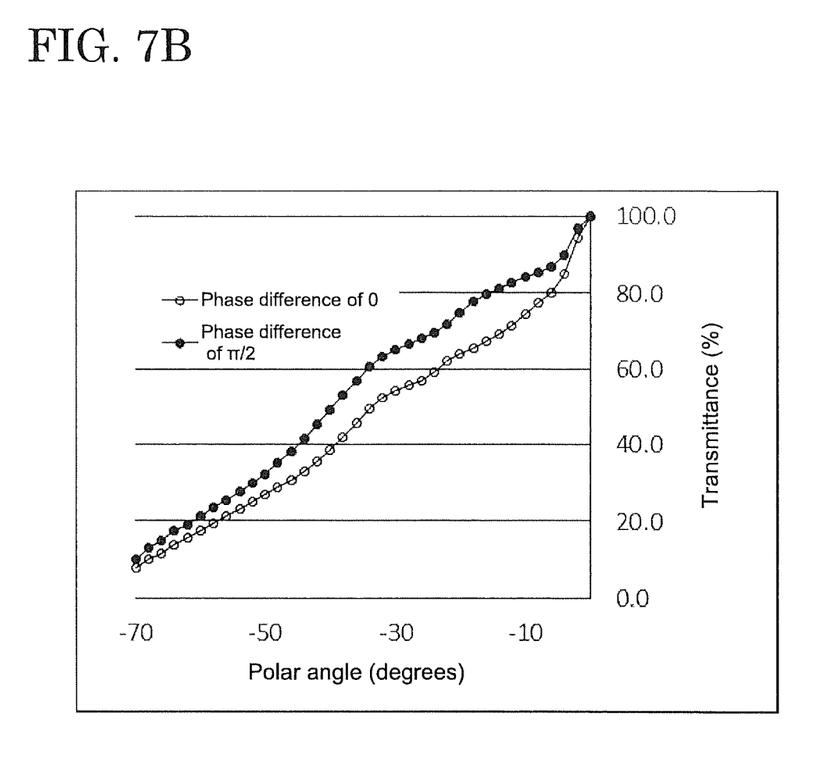
FIG. 7B is a graph showing a transmittance of a first liquid crystal cell of an optical element according to an embodiment of the present invention.

FIG. 7A and FIG. 7B are graphs showing a transmittance of the first liquid crystal cell 110-1 of the optical element 10 according to an embodiment of the present invention. The transmittance was measured by inputting the signals with the phase difference of 0 or the signals with the phase difference of π/2 to the transparent electrodes 130 of the first liquid crystal cell 110-1. Here, the width of the transparent electrode 130 of the first liquid crystal cell 110-1 used for the measurement was 8 μm, and the distance between two adjacent transparent electrodes 130 was 8 μm. Further, the thickness of the first liquid crystal layer 160-1 was 30 μm. Furthermore, the high potential of the signal was 30V, and the low potential of the signal was 0V. The polar angles shown in FIG. 7A and FIG. 7B represent angles from the z-axis direction. FIG. 7A is a graph in which a transmittance at a polar angle of 0 degrees is normalized as 100% for the input of signals with the phase difference of 0. Further, FIG. 7B is a graph in which a transmittance at a polar angle of 0 degrees is normalized as 100% for each of the input of the signals with the phase difference of 0 and the input of the signals with the phase difference of π/2.

As shown in FIG. 7A, near the polar angle of 0 degrees, the transmittance in the input of the signals with the phase difference of π/2 is lower than the transmittance in the input of the signals with the phase difference of 0. Further, in the range of −30 degrees to −50 degrees, the transmittance in the input of the signals with the phase difference of π/2 is increased compared to the transmittance in the input of the signals with the phase difference of 0. That is, the scattering characteristic of the first liquid crystal layer 160-1 in the input of the signals with the phase difference of π/2 is stronger than that in the input of the signals with the phase difference of 0, and the light passing through the first liquid crystal cell 110-1 is more diffused. This can also be understood from FIG. 7B. As shown in FIG. 7B, the ratio of the transmittance to the polar angle of 0 degrees is more increased in the input of the signals with the phase difference of π/2 than in the input of the signals with the phase difference of 0, at least in the range of the polar angle greater than or equal to −70 degrees and less than 0 degrees.

Therefore, in the optical element 10 according to an embodiment of the present invention, the light distribution can be controlled by changing the phase of the signal without changing the amplitude of the potential of the signal input to the liquid crystal cell 110.

Figure 8:
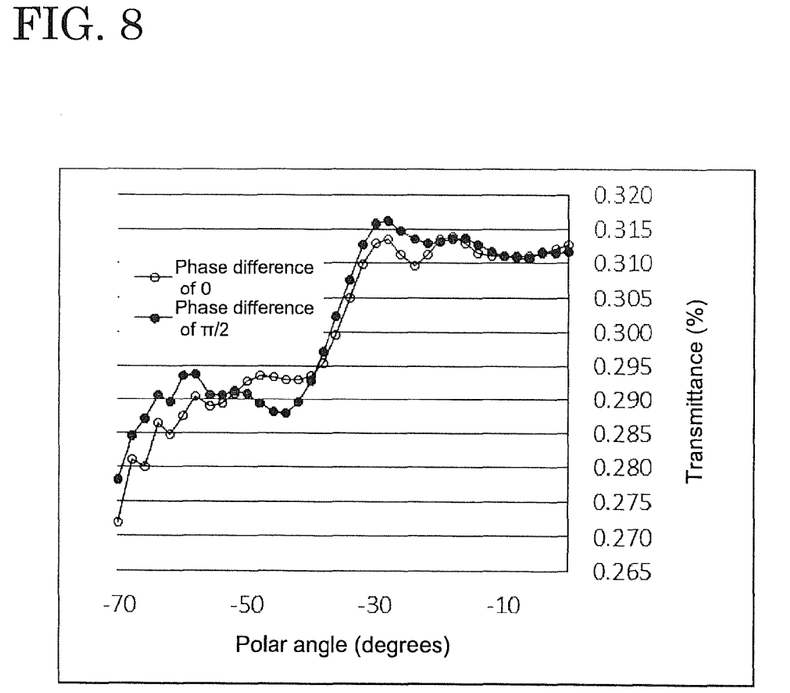
FIG. 8 is a graph showing an x-coordinate of a chromaticity coordinate of light passing through a first liquid crystal cell of an optical element according to an embodiment of the present invention.

FIG. 8 is a graph showing an x-coordinate of a chromaticity coordinate of light passing through the first liquid crystal cell 110-1 of the optical element 10 according to an embodiment of the present invention. White light was used for the light source. As shown in FIG. 8, the chromaticity coordinate is changed in both the input of the signals with the phase difference of 0 and the input of the signals with a phase difference of π/2. Therefore, in the optical element 10 according to an embodiment of the present invention, the color of the light distribution can also be changed by changing the phase of the signals input to the liquid crystal cell 110. For example, in the case of white light, a reddish warm color or bluish cool light can be emitted from the optical element 10 by changing the phase of the signals.

In addition, although the input of the signals with the phase difference of 0 and the input of the signals with the phase difference of π/2 are described in the above description, the phase difference of signals input to the transparent electrode 130 is not limited thereto. The phase difference can be set to an arbitrary value α such that $0 \leq \alpha \leq \pi$. In the optical element 10 according to an embodiment of the present invention, it is possible to control the light distribution differently from conventional methods, in particular, when the phase difference satisfies $0 < \alpha < \pi$.

Further, the light distribution of the optical element 10 can be roughly adjusted by the amplitude of the supplied potential, and the light distribution can be finely adjusted by the phase difference of the signal.

As described above, the light distribution can be controlled by changing the phase difference of the signals in the optical element 10. That is, the light distribution is controlled by changing the phase difference of the signals input to the transparent electrodes 130 in the method for driving the optical element 10 according to an embodiment of the present invention. In other words, the light distribution can be easily controlled by adjusting the timing of the signals input to the transparent electrodes 130 in the method for driving the optical element 10 according to the embodiment of the present invention. Further, although the optical element 10 includes one or more liquid crystal cells 110, it is sufficient that at least one of the one or more liquid crystal cells 110 has the light distribution control that changes the phase difference. This allows fine adjustment of the light distribution. Furthermore, when the optical element 10 includes two liquid crystal cells 110, each of the two liquid crystal cells 110 may be driven to have a different phase difference. For example, the first liquid crystal cell 110-1 may be driven by inputting signals with a phase difference α, and the second liquid crystal cell 110-2 may be driven by inputting signals with a phase difference β different from the phase difference α.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. A method for driving an optical element comprising a first liquid crystal cell including a first substrate on which a first transparent electrode and a second transparent electrode are alternately arranged in a first direction, a first alignment film having an alignment direction in the first direction and covering the first transparent electrode and the second transparent electrode, a second substrate on which a third transparent electrode and a fourth transparent electrode are alternately arranged in a second direction orthogonal to the first direction, a second alignment film having an alignment direction in the second direction and covering the third transparent electrode and the fourth transparent electrode, and a first liquid crystal layer between the first substrate and the second substrate, comprising the steps of:

inputting a first signal to the first transparent electrode;
inputting a second signal having a phase difference of x with respect to the first signal to the second transparent electrode;
inputting a third signal having a phase difference of a with respect to the first signal to the third transparent electrode; and
inputting a fourth signal having a phase difference of x with respect to the third signal to the fourth transparent electrode.

2. The method for driving an optical element according to claim 1, wherein the phase difference of a satisfies $0 < \alpha < \pi$.

3. The method for driving an optical element according to claim 1, wherein the phase difference of α is π/2.

4. The method for driving an optical element according to claim 1,
wherein the optical element further comprises a second liquid crystal cell on the first liquid crystal cell,
the second liquid crystal cell includes
a third substrate on which a fifth transparent electrode and a sixth transparent electrode are alternately arranged in a first direction,
a fourth substrate on which a seventh transparent electrode and an eighth transparent electrode are alternately arranged in a second direction orthogonal to the first direction, and
a second liquid crystal layer between the third substrate and the fourth substrate, and
the method further comprises the steps of:
inputting a fifth signal to the fifth transparent electrode,
inputting a sixth signal having a phase difference of π with respect to the fifth signal to the sixth transparent electrode;
inputting a seventh signal having a phase difference of β with respect to the fifth signal to the seventh transparent electrode; and
inputting an eighth signal having a phase difference of π with respect to the seventh signal to the eighth transparent electrode.

5. The method for driving an optical element according to claim 4, wherein the phase difference of β is identical to the phase difference of α.

6. The method for driving an optical element according to claim 4, wherein the phase difference of β is different from the phase difference of α.

7. The method for driving an optical element according to claim 4, wherein the phase difference of β is 0.

* * * * *